Dec. 4, 1956  F. O. RICKERS  2,772,975
INJECTING OF HOPS IN THE BREWING OF BEER
Filed July 8, 1955  2 Sheets-Sheet 1
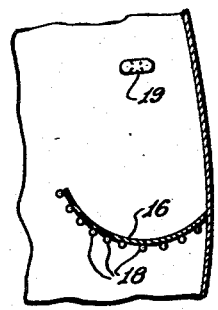
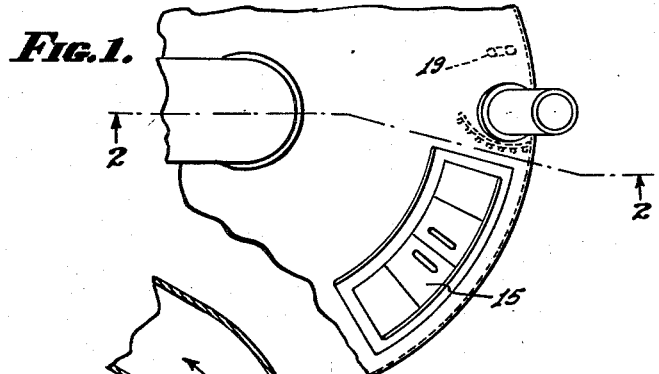
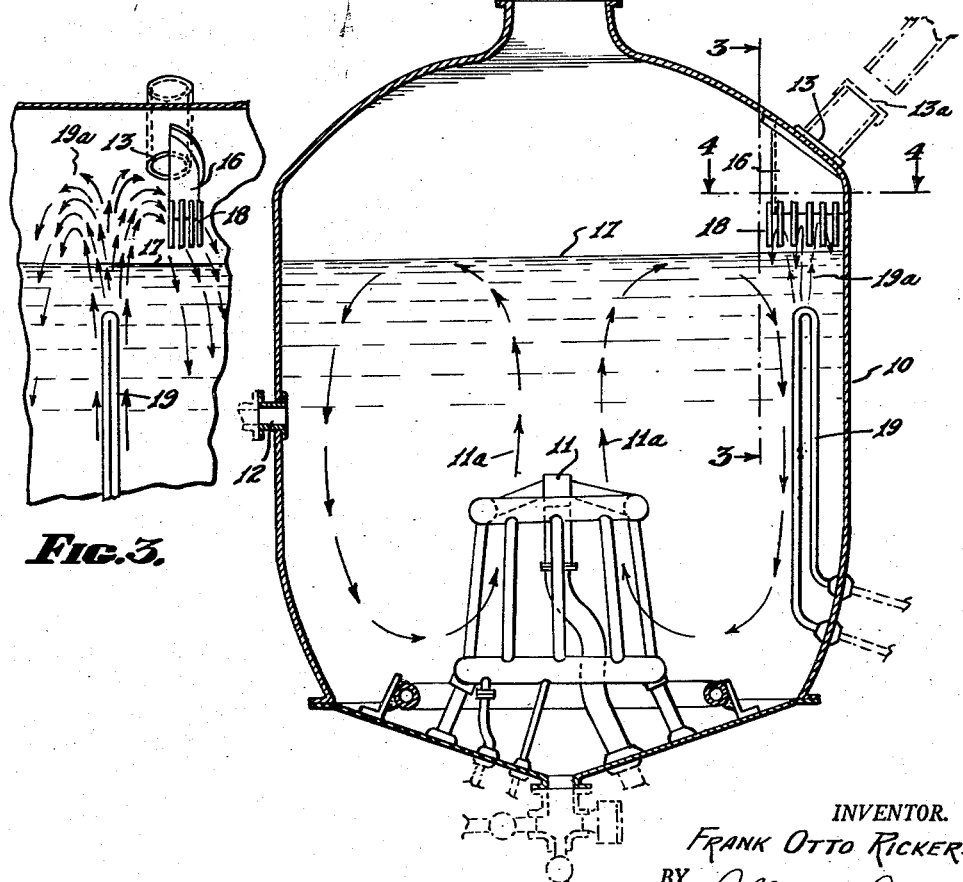
INVENTOR.
FRANK OTTO RICKERS,
BY
ATTORNEYS.

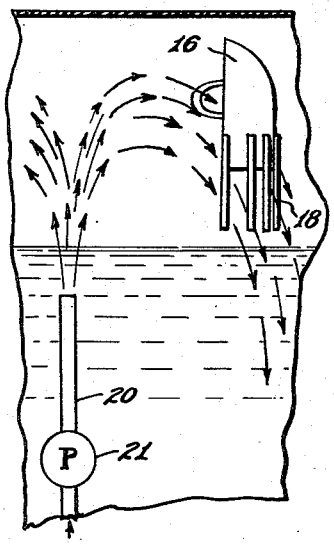
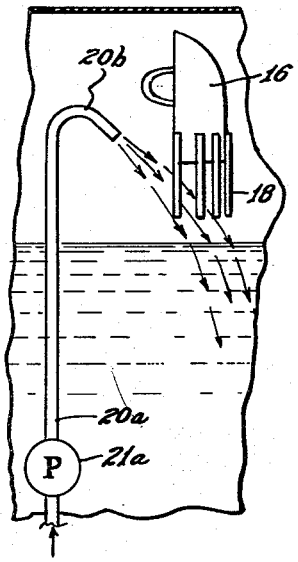
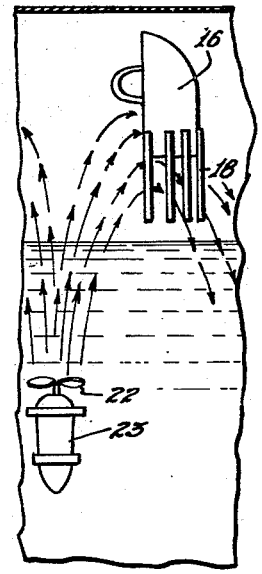
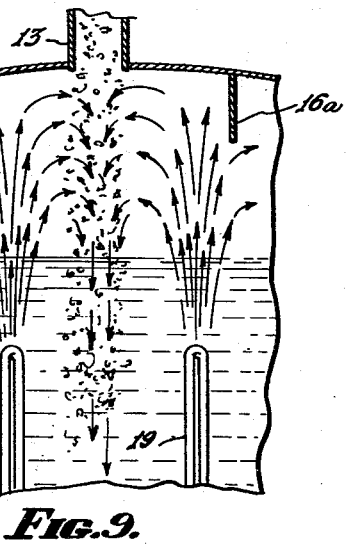
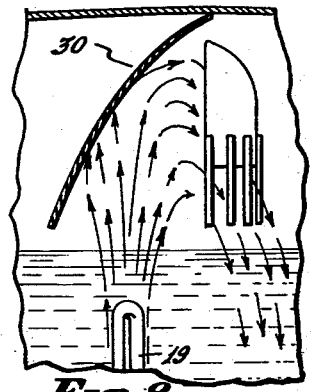

United States Patent Office 2,772,975
Patented Dec. 4, 1956

2,772,975

INJECTING OF HOPS IN THE BREWING OF BEER

Frank Otto Rickers, Cincinnati, Ohio, assignor to The Geo. Wiedemann Brewing Co., Inc., Newport, Ky., a corporation of Kentucky Application July 8, 1955, Serial No. 520,814

8 Claims. (Cl. 99—50.5)

This invention relates to the injecting of hops during the process of brewing beer, and is a continuation-in-part of my copending application, Serial No. 454,970, filed September 9, 1954. It is not necessary for an understanding of the present invention to go into all the details of the brewing process and therefore only so much of the brewing process will be discussed herein as is necessary to an understanding of the present invention.

At a certain stage of the brewing process, the brewing kettle is filled with wort, which is a malt and grain extract. The wort is drained into the kettle through straining devices and the filling of the kettle takes perhaps three to five hours, depending upon the particular size of the kettle. As the kettle is being filled, the wort in the kettle is heated and is boiling in the kettle as the filling process proceeds.

When the kettle has been filled to the required level with wort, the hops are added and the hops are then cooked in the wort. The period of cooking the hops has a great deal to do with the flavor of the final beer and varies from one beer to another. In some brews the hops are only cooked for about five minutes as a standard period.

Hops contain aromatic and bittering principals which are sensitive to oxidation and evaporation. This type of deteriorating effect is prevented by storing in cold temperatures in compressed bales. The deteriorating effect is noticeable at room temperature in the uncompressed state and is very fast at the high temperature of a kettle.

It is, therefore, normal practice to break the compressed lumps apart, either by machine or mostly by hand, weigh into batches and add to the kettle, either through a stack or through the operating manhole of the kettle cover. They can be considered in proper state when they are submerged and circulating freely in the kettle as single cones. Hops, which although added to kettle are floating on the top of the wort, are subject to heat deterioration and are not being extracted properly. The time of extraction is influenced as well. The operator endeavors to stir the hops around so as to break up the lumps and get the hops fairly uniformly distributed through the brew by means of a long wooden paddle, but since the kettles are quite large it is impossible to insure a uniform distribution of the hops in the brew in the manner described above. Furthermore, some of the hops which have flaked off from the lumps in falling down the chute are carried up the flue out of the kettle and do not enter into the brew at all. The result has been that the step of adding the hops and cooking the hops has been subject to considerable variation so that beer from different batches often has quite a different flavor because it has been impossible heretofore to insure a uniform mixture of the hops in the brew so that a precisely controlled cooking time could be established.

With the foregoing considerations in mind, it is an object of the present invention to provide for the addition of the hops to a brew kettle in a manner such that the hops will be uniformly distributed through the brew and so that the loss of hops up the flue will be minimized. Thus, it is an object of the present invention to provide for greatly increased control over this step of the brewing process to the end that each successive brew will have undergone the same length of time in the cooking of the same amount of hops.

These and other objects of the invention which I shall point out in greater detail hereinafter or which will be apparent to one skilled in the art upon reading these specifications, I accomplish by that certain construction and arrangement of parts and by that series of method steps of which I shall now disclose certain exemplary embodiments.

Reference is made to the drawings forming a part hereof and in which:

Figure 1 is a fragmentary plan view of a typical brewing kettle.

Figure 2 is a cross-sectional view of the same taken on the line 2—2 of Figure 1.

Figure 3 is a fragmentary cross-sectional view taken on the line 3—3 of Figure 2.

Figure 4 is a fragmentary cross-sectional view on a slightly enlarged scale taken on the line 4—4 of Figure 2.

Figures 5, 6 and 7 are views similar to Figure 3 showing modifications.

Figure 8 is a view similar to Figure 3 showing a modification.

Figure 9 is a view similar to Figure 3 showing another modification.

Briefly, in the practice of my invention I provide means for insuring that the hops, as they are added to the kettle, are wetted down and caused to enter below the surface of the brew in a rather closely confined area and I provide for a localized ebullition and circulation of the brew such that the lumps or fragments of hops are carried by this localized ebullition and circulation down into the bottom of the kettle whence they are uniformly distributed by the general circulation in the kettle.

Referring now more specifically to Figures 1 to 4 inclusive, a typical brewing kettle is shown at 10. The kettle will not be described in detail because it is in all respects conventional except as will be pointed out hereinafter. Means generally indicated at 11, are provided within the kettle for heating the brew to the boiling point and an opening is provided at 12 through which the wort is fed into the kettle. An opening at 13 serves for the addition of the hops. In addition there is usually provided the opening 15 in the top of the kettle through which the action may be inspected or through which a stirring paddle may be inserted. This is where the hops are usually added.

According to the present invention, a baffle 16 leads downwardly from the opening 13 to a point above the normal liquid level 17 in the kettle.

To give strength and to provide freedom of liquid motion at its lower end, it is constructed of a plurality of rods. The baffle is secured by welding, or in other suitable manner, to the wall or top of the kettle 10.

The top part is covered with a solid sheet to provide an air current barrier. While it is preferable that the solid barrier terminate some 2" to 6" above the liquid level, it is held higher than this to operate with a varying liquid level. The extended rod system provides sufficient barrier without blocking the flow of hops and the below level currents which carry them away, should the liquid level be high.

I then provide a special heating means 19 which may be a hairpin shaped pipe through which steam may be passed and the heating means is offset from the axis of the opening 13, as best seen in Figures 3 and 4.

It will be clear that as additional heat is supplied by the heating means 19, a localized ebullition of the brew is achieved as shown by the arrows in Figure 3, with the wort boiling up in the manner of a fountain. This fountain splashes forcibly into the column of hops being charged through the opening 13. The barrier at 16 and 18 restrains the hops from moving out of the field of wetting action. The wetted hops sink down into the kettle below the surface of the wort where they are caught in the main circulation system of the kettle. It is within the scope of the invention to use additional means to direct the fountain against the column of hops.

It will be understood that the heating means 11 provides in general for a circulation such as is shown by the arrows 11a in Figure 2. This circulation is conventional and may be thought of as in the shape of a doughnut with the heated liquid rising in a column in the center of the kettle and then moving radially outward and circulating down adjacent the walls of the kettle. However, the element 19 provides for a localized ebullition throwing wort well above the liquid level. When it falls back, it adds to the normal downward circulation of the kettle at the point of hop addition to insure that the hops will be thoroughly wetted down and subjected to additional turbulence and will be carried downwardly into the kettle.

The baffle 16 terminates well short of the liquid and prevents air currents from carrying hops up the stack. However, the baffle 16 and the rods 18 insure that the hops will fall into the kettle at a point where they will be wetted down as a result of the ebullition above described.

A cover 13a may be provided for use during the period when hops are not being charged into the kettle.

In Figures 5, 6 and 7, I have shown other ways in which the same result may be achieved. In each of these cases the baffle 16 and the rods 18 are as have been described above but the force of liquid mixing with the hops above the surface is induced in different ways. In Figure 8 I have shown the use of a deflector plate 30 to divert more of the liquid thrown up by the hop fountain toward the column of hops. In Figure 5 I have disclosed a pipe 20 with a pump 21 and the forceful action is produced as shown by the arrows in Figure 5. In Figure 6 I have shown a pipe 20a and a pump 21a similar to those of Figure 5, except that the upper end of the pipe 20a extends up out of the brew and is bent over as at 20b. This arrangement produces a more pronounced wetting action.

In Figure 7, I have simply shown a propeller or agitator 22 driven by a motor 23 to produce a fountain effect similar to the ebullition of Figures 2 and 3. In Figure 9, two hop fountains are used to increase the wetting effect and to reduce the need for a baffle as at 16a. A baffle is only needed as an air current barrier usually when the fall from the entrance at 13 to the liquid level is greater than two feet, the height of the fountains obtainable being two feet and more. It will be clear that I do not wish to limit myself to the specific means for inducing the circulation and fountain effect desired.

It will be clear from the foregoing description that the introduction of hops into the kettle can be greatly speeded up. I have found it possible to add a normal charge of 120 pounds of hops in one minute. Since the hops are immediately wetted down and mixed into the brew, it will be clear that a precise timing of the hop cooking period is possible. The importance of this will be understood when it is realized that with some brews the hops are only cooked for five minutes, so that the time required to add the hops and the time required to distribute them thoroughly through the brew becomes important factors in the final result.

Furthermore, hops no longer float around on top of the wort and therefore the need for manual stirring is eliminated and since the hops are not carried up the flue, it is no longer necessary for the brewer to lower the cooking and circulating intensity to reduce draft while the hops are being added, as has been the general practice in the past.

In practice, when the kettle is almost completely charged with the wort and somewhat before the hops are to be added, the heating element 19 or two heating elements or the pump 21 or 21a or the circulator 22 are started so as to cause the circulation and fountain effect above described. The hops are then added and will be wetted down or soaked and distributed as has been disclosed above. Thereafter the ebullition means may be cut off and the brewing carried on as before.

It will be clear that numerous modifications may be made without departing from the spirit of my invention and I therefore do not intend to limit myself except as set forth in the claims which follow.

Having now fully described my invention, what I claim as new and desire to secure by Letters Patent is:

1. In a brewing kettle for the brewing of beer wherein a normal level of brew is maintained, and having a free space above the said normal level, and comprising heating means within the kettle for heating the brew to a boil to produce a normal upward, radial lateral, downward, and radial lateral circulation thereof, a hop feed means mounted in the top portion of the kettle through which hops are introduced in a falling column, said hop feed means being located at a point where said column falls into downwardly circulating brew, and supplemental circulating means offset from the vertical projection of said hop feed means, said supplemental circulating means producing in the brew a localized ebullition to provide a fountain playing upwardly out of said brew and falling downwardly under said hop feed means into said column of falling hops, whereby to wet down said hops thoroughly as they fall in said column from said hop feed means into the brew.

2. A brewing kettle according to claim 1, wherein there is secured to said kettle a substantially vertically downwardly extending baffle for said falling column to one side of the vertical projection of said hop feed means within the kettle, terminating above said normal level of brew, said baffle being imperforate from the top of the kettle to a point well above said normal level of brew and having a plurality of parallel spaced rods extending downwardly from the lower edge of said baffle to a point above the normal level of the brew, said supplemental circulating means being disposed on the opposite side of the vertical projection of said hop feed means from said baffle.

3. A brewing kettle according to claim 2, wherein the said supplemental circulation means comprises a heating element vertically disposed in said kettle and offset from the vertical projection of said hop feed means.

4. A brewing kettle according to claim 1, wherein said supplemental circulating means comprises two heating elements vertically disposed on diametrically opposed sides of the vertical projection of said hop feed means.

5. A brewing kettle according to claim 1, wherein said supplemental circulating means comprises a pipe vertically disposed in said kettle and offset from the vertical projection of said hop feed means, and a pump for producing an upward flow of the brew through said pipe.

6. A kettle according to claim 5, wherein said pipe at its upper end has a portion directed toward the vertical projection of said hop feed means.

7. A kettle according to claim 1, wherein said supplemental circulating means comprises propeller means within said kettle and offset from the vertical projection of said hop feed means, and driving means for said propeller means to produce an upward flow and fountain of the brew playing toward said vertical projection.

8. The method of brewing malt beverages, comprising the steps of boiling the wort, adding the hops to the boiling wort at a point where the boiling wort is moving downwardly, while producing in the boiling wort, adjacent the point where the hops are being added, a supplementary, highly localized ebullition of such intensity as to produce a fountain, playing onto the hops being added and immediately and thoroughly wetting them down as they are being added, and introducing them under the surface of the wort.

References Cited in the file of this patent

UNITED STATES PATENTS

| | | |
|---|---|---|
| 218,231 | Clausen et al. | Aug. 5, 1879 |
| 297,467 | Steinke | Apr. 22, 1884 |
| 328,585 | Hornbostel | Oct. 20, 1885 |
| 399,803 | Wagner | Mar. 9, 1889 |
| 732,350 | Henius | June 30, 1903 |
| 1,232,098 | Schneider | July 3, 1917 |
| 2,468,840 | Schock | May 3, 1949 |
| 2,586,818 | Harms | Feb. 26, 1952 |

FOREIGN PATENTS

| | | |
|---|---|---|
| 18,270 | Great Britain | 1912 |
| 36,885 | Sweden | June 3, 1914 |
| 515,640 | France | Nov. 27, 1920 |
| 107,579 | Austria | Oct. 25, 1927 |